(12) United States Patent
Chang

(10) Patent No.: US 9,810,125 B2
(45) Date of Patent: Nov. 7, 2017

(54) CATALYTIC CONVERTER

(71) Applicant: JUMBOMAW TECHNOLOGY CO., LTD., Taoyuan (TW)

(72) Inventor: Hsin-Chang Chang, Taoyuan (TW)

(73) Assignee: JUMBOMAW TECHNOLOGY CO., LTD., Taoyuan (TW)

(*) Notice: Subject to any disclaimer, the term of this patent is extended or adjusted under 35 U.S.C. 154(b) by 175 days.

(21) Appl. No.: 14/961,899

(22) Filed: Dec. 8, 2015

(65) Prior Publication Data
US 2017/0159528 A1   Jun. 8, 2017

(51) Int. Cl.
| B01D 50/00 | (2006.01) |
| F01N 3/28 | (2006.01) |
| F01N 13/00 | (2010.01) |
| B01D 53/94 | (2006.01) |

(52) U.S. Cl.
CPC ....... *F01N 3/2842* (2013.01); *B01D 53/9477* (2013.01); *F01N 13/0093* (2014.06); *F01N 13/011* (2014.06); *B01D 2255/1021* (2013.01); *B01D 2255/1023* (2013.01); *B01D 2255/1025* (2013.01); *F01N 2330/32* (2013.01); *F01N 2330/48* (2013.01)

(58) Field of Classification Search
CPC ........ F01N 3/2842; F01N 3/28; F01N 3/2803; F01N 2330/32; F01N 2330/48; F01N 2330/40; B01D 2250/1023; B01D 2250/25; B01D 2250/2021
USPC ................................................ 422/171, 180
See application file for complete search history.

(56) References Cited

U.S. PATENT DOCUMENTS

| 6,170,259 B1 * | 1/2001 | Boegner ............ B01D 53/9495 60/286 |
| 7,334,400 B2 * | 2/2008 | Yan ....................... F01N 13/011 423/239.1 |
| 7,673,446 B2 * | 3/2010 | Zemskova ......... B01D 53/9431 60/276 |
| 2002/0044897 A1 * | 4/2002 | Kakwani ............ B01D 53/9409 422/172 |

(Continued)

FOREIGN PATENT DOCUMENTS

| EP | 0667445 A1 | 8/1995 |
| EP | 1882090 | 1/2008 |
| JP | 3922011 B2 | 5/2007 |

(Continued)

*Primary Examiner* — Tom P Duong
(74) *Attorney, Agent, or Firm* — Pai Patent & Trademark Law Firm; Chao-Chang David Pai

(57) ABSTRACT

Provided is a catalytic converter, having a first casing, a first honeycomb carrier disposed in the first casing, multiple second casings connected to the first casing, and multiple second honeycomb carriers each respectively disposed in the second casings. The first honeycomb carrier has multiple first metal sheets and a first catalyst layer formed on the first metal sheets. The first metal sheets are disposed in the first casing to form multiple first channels. Each of the second honeycomb carriers has a similar structure with that of the first honeycomb carrier. The materials of the first and the second catalyst layers include platinum, palladium, and rhodium. The exhaust gas is subjected to redox reaction by the first and the second catalyst layers and burned at high temperature, and thus the emission of the harmful components from the diesel engine is reduced.

19 Claims, 4 Drawing Sheets

(56) References Cited

U.S. PATENT DOCUMENTS

2004/0112046 A1* 6/2004 Tumati .................. F01N 3/0256
60/297
2006/0010859 A1* 1/2006 Yan ....................... F01N 13/011
60/286

FOREIGN PATENT DOCUMENTS

| | | |
|---|---|---|
| JP | 2011-226421 A | 11/2011 |
| JP | 2014-198319 A | 10/2014 |
| WO | 2006/100003 A1 | 9/2006 |

* cited by examiner

CATALYTIC CONVERTER

BACKGROUND OF THE INVENTION

1. Field of the Invention

The present invention relates to a catalytic converter, more particularly to a catalytic converter for a diesel engine.

2. Description of the Prior Arts

Engine is a common modern power unit for various vehicles such as generators, aircrafts, automobiles, and motorcycles. Take diesel automobiles as an example, diesel engines are the power source. The diesel fuel is burned in the diesel engines to produce heat and gas, which power the diesel automobile.

If incomplete combustion of diesel fuel occurs, carbon monoxide, hydrocarbons, nitrogen oxides, and suspended particulate matter having particle size less than 2.5 micrometers are emitted. The exhaust gas of said compositions leads to poor visibility and air quality, brings unpleasant odor, and poses a threat to human respiratory system. Long-term exposure to exhaust gas also increases the incidence of allergy, asthma and emphysema.

To mitigate the problems caused by incomplete combustion, a particulate filter is installed between the diesel engine and the exhaust pipe. Components of exhaust gas are adsorbed by the filter for reducing exhaust gas emission. However, lots of ashes are accumulated on the filter after a period of time. If the accumulated ashes are not cleaned, they will block exhaust emission, resulting in the decrease of engine efficiency and the increase of the fuel consumption of the diesel engine.

To overcome the shortcomings incurred from reducing the exhaust emission by adsorption, the present invention provides a catalytic converter to mitigate or obviate the aforementioned problems.

SUMMARY OF THE INVENTION

An objective of the present invention is to reduce the emissions of harmful components in the exhaust gas by catalyzing and burning the exhaust gas at high temperature, such as 450° C. or higher, so as to overcome the foresaid problems.

The present invention provides a catalytic converter, which has a first casing, a first honeycomb carrier disposed in the first casing, multiple second casings connected to the first casing, and multiple second honeycomb carriers each respectively disposed in the second casings. The first honeycomb carrier has multiple first metal sheets and a first catalyst layer. The first metal sheets are disposed in the first casing and connected with each other to form multiple first channels in the first casing, and the first catalyst layer is formed on the surfaces of the first metal sheets. Each one of the second honeycomb carriers has multiple second metal sheets and a second catalyst layer. The second metal sheets are disposed in the corresponding second casing and connected with each other to form multiple second channels in the corresponding second casing, and the second catalyst layers are formed on the surfaces of the respective second metal sheets. The materials of the first catalyst layer and the second catalyst layers include platinum, palladium, and rhodium.

When the catalytic converter is used on the diesel engine, all catalyst layers can catalyze the redox reaction of the exhaust gas so as to reduce the amount of the harmful components contained in the exhaust gas from the diesel engine.

Preferably, the cell density of the first honeycomb carrier is less than that of each one of the second honeycomb carriers.

Preferably, the cell density of the first honeycomb carrier ranges from 200 cells per square inch (cpsi) to 300 cpsi, and the cell density of each one of the second honeycomb carriers ranges from 600 cpsi to 800 cpsi. With the cell densities of the first and the second honeycomb carriers, the first honeycomb carrier does not produce back pressure to the diesel engine and thus not affect the emission of exhaust gas.

Preferably, there is more rhodium than platinum or palladium in the element content of the first catalyst layer.

Preferably, there are more palladium than platinum or rhodium in the element content of the second catalyst layers.

Preferably, the first metal sheets use iron-chromium-aluminum alloy foils as base structure and nickel foils as brazing filler metal, and the second metal sheets also use iron-chromium-aluminum alloy foils as base structure and nickel foils as brazing filler metal.

Preferably, the first honeycomb carrier has a first hollow cylinder disposed in the first casing, and the first metal sheets are disposed in the first hollow cylinder and connected with each other to form the first channels in the first hollow cylinder. Each one of the second honeycomb carriers has a second hollow cylinder disposed in the corresponding second casing, and the second metal sheets of each one of the second honeycomb carriers are disposed in the corresponding second hollow cylinder and connected with each other to form the second channels in each one of the second hollow cylinders.

Preferably, the first casing and the second casings are connected with each other through the first connection pipe.

Preferably, the numbers of the second casings are corresponding to the numbers of the second honeycomb carriers, which can be even number such as two, four, or six, but are not limited to these. The numbers of the second casings or second honeycomb carriers can be modified depending on the horsepower of the diesel automobiles.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
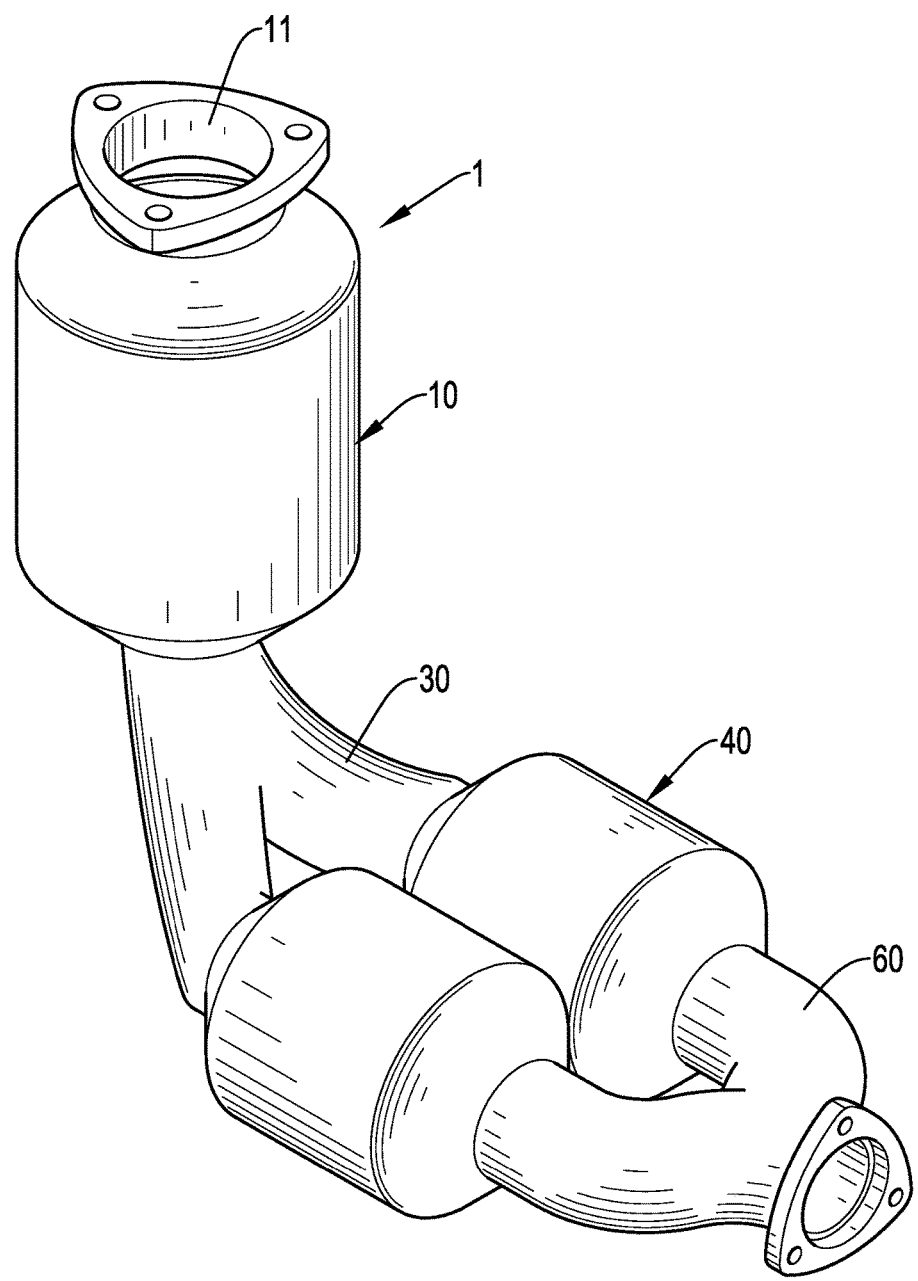
FIG. 1 is a schematic view of a catalytic converter in accordance with the present invention.
Figure 2:
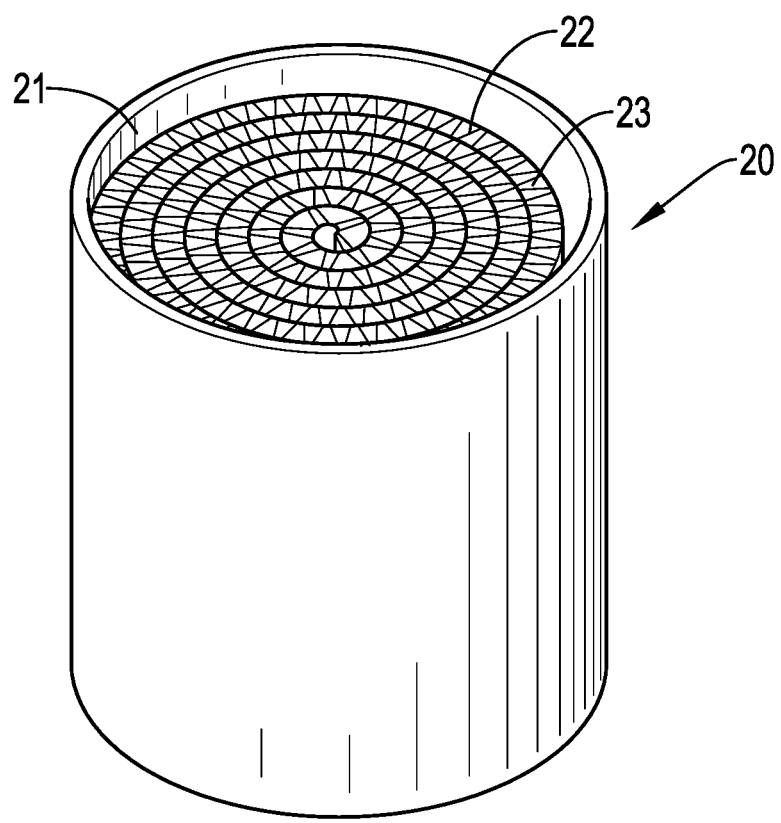
FIG. 2 is a schematic view of a first honeycomb carrier in the catalytic converter in accordance with the present invention.
Figure 3:
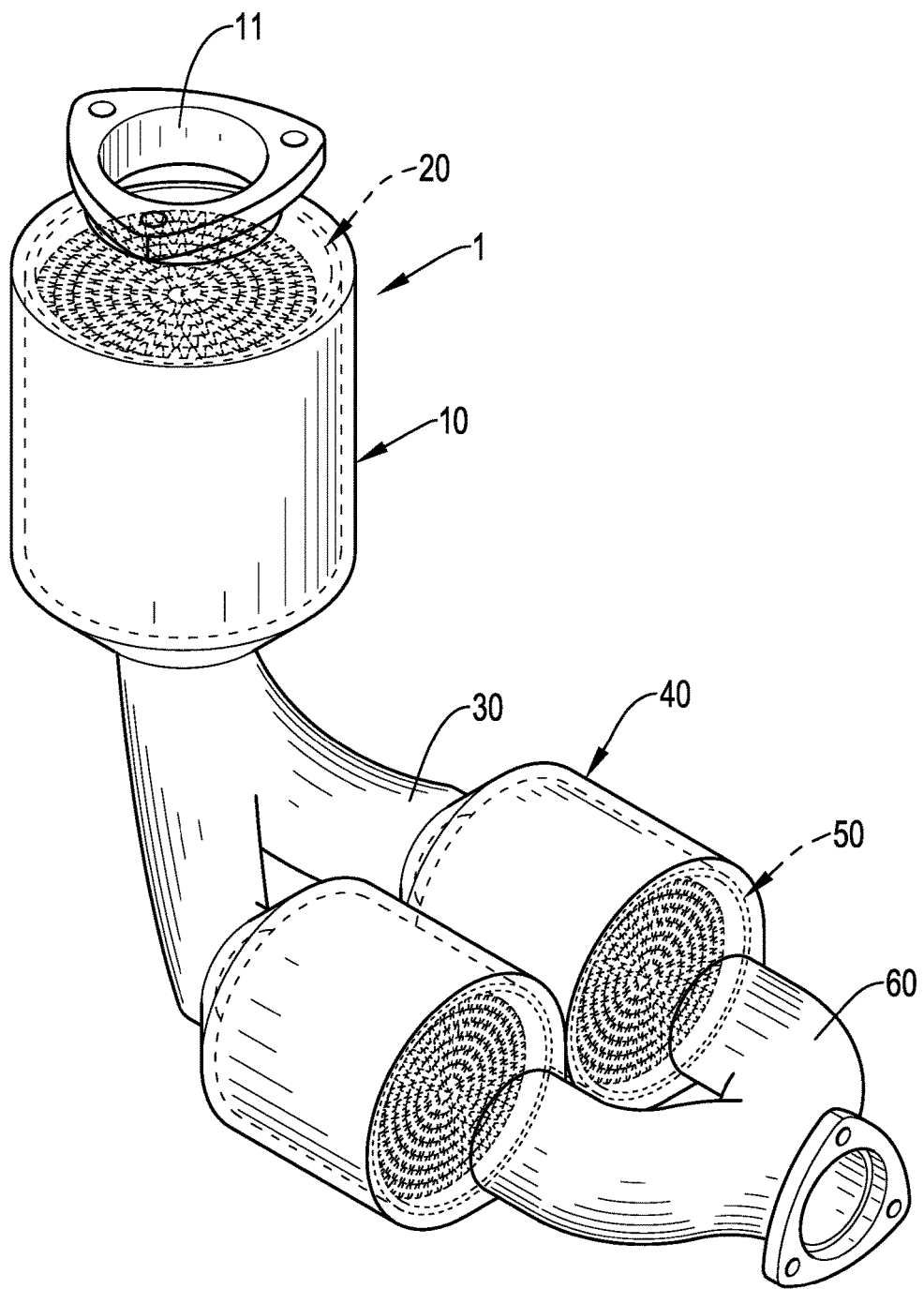
FIG. 3 is a perspective view of the catalytic converter in accordance with the present invention.

A representative example of a catalytic converter in accordance with the present invention is illustrated in FIGS. 1 to 3. The catalytic converter 1 has a first casing 10, a first honeycomb carrier 20, a first connection pipe 30, two second casings 40, two second honeycomb carriers 50, and a second connection pipe 60.

With reference to FIG. 1, the first casing 10 has an upper opening 11 and a lower opening opposite the upper opening 11. The upper opening 11 is connected to the lower opening.

With reference to FIGS. 2 and 3, the first honeycomb carrier 20 is disposed in the first casing 10, and has a first hollow cylinder 21, multiple first metal sheets 22 and a first catalyst layer (not shown in figures). The first hollow cylinder 21 is disposed in the first casing 10, and is made of stainless steel (SUS#430). The first metal sheets 22 use iron-chromium-aluminum alloy foils as base structure and nickel foils as brazing filler metal, and are disposed in the first hollow cylinder 21 and connected with each other to form multiple first channels 23 in the first hollow cylinder 21. The first channels 23 communicate with the upper opening 11 and the lower opening of the first casing 10. The first honeycomb carrier 20 has a cell density of 300 cells per square inch (cpsi). The first catalyst layer is coated on the surfaces of the first metal sheets 22 and made of platinum, palladium, and rhodium, with the amount of rhodium more than that of platinum or palladium. More specifically, the ratio of platinum, palladium, and rhodium in amount is 2:1:5.

With reference to FIG. 1, the first connection pipe 30 is a pipe with double output, and has an inlet and two outlets, and both the outlets communicate with the inlet. The inlet of the first connection pipe 30 is tightly welded to the lower opening of the first casing 10, and thus the first connection pipe 30 communicates with the upper opening 11 and the first channels 23 of the first honeycomb carrier 20.

With reference to FIG. 1, one of the second casings 40 is tightly welded to one of the outlets of the first connection pipe 30, the other second casing 40 is tightly welded to the other outlet of the first connection pipe 30. With said configuration, the first casing 10 communicates with both of the second casings 40.

With reference to FIG. 3, the second honeycomb carriers 50 are each respectively disposed in the second casings 40. The structure of each second honeycomb carrier 50 is similar to that of the first honeycomb carrier 20 shown in FIG. 2. That is, each one of the second honeycomb carriers 50 has a second hollow cylinder, multiple second metal sheets and a second catalyst layer. The second hollow cylinders are respectively disposed in the second casings 40, both are made of stainless steel (SUS#430). Likewise, the second metal sheets use iron-chromium-aluminum alloy foils as base structure and nickel foils as brazing filler metal. Said second metal sheets of each one of the second honeycomb carriers 50 are disposed in its corresponding second hollow cylinder and connected with each other to form the second channels in its corresponding second casing 40. The second channels of the second honeycomb carriers 50 communicate with the first channels 23 of the first honeycomb carrier 20 disposed in the first casing 10 through the first connection pipe 30. The second honeycomb carrier 50 has a cell density of 800 cpsi. The second catalyst layer is coated on the surfaces of the second metal sheets and also made of platinum, palladium, and rhodium, but the amount of palladium is more than that of platinum or rhodium. More specifically, the ratio of platinum, palladium, and rhodium in amount is 1:35:1.

With reference to FIG. 1, the second connection pipe 60 is a pipe with double input and has two inlets and one outlet, and the outlet communicates with the inlets. The inlets of the second connection pipe 60 are respectively tightly welded to the openings of the second casings 40 opposite the first connection pipe 30, such that the second connection pipe 60 communicates with the second casings 40, the first connection pipe 30, and the first casing 10.

Figure 4:
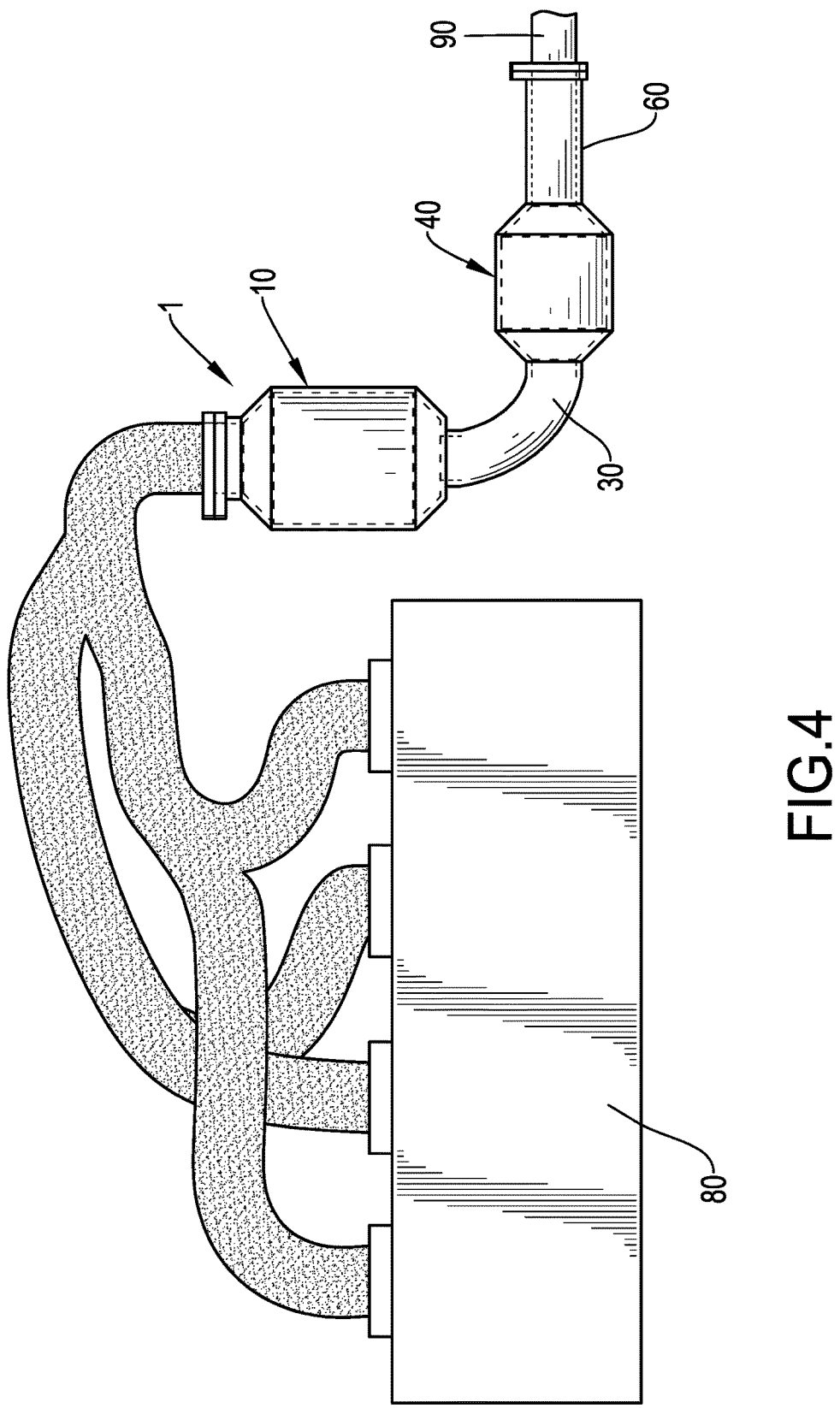
FIG. 4 is a schematic view of the catalytic converter connected to a diesel engine and an exhaust pipe.

With reference to FIGS. 1, 3, and 4, the catalytic converter 1 is connected to the diesel engine 80 by the upper opening 11, and the outlet of the second connection pipe 60 is connected to the exhaust pipe 90. When the diesel engine 80 runs with oxygen gas not enough to fully combust the diesel fuel, the exhaust gas discharged from the diesel engine 80 flows into the first casing 10 through the upper opening 11, then passes through the first channels 23 of the first honeycomb carrier 20, the first connection pipe 30, the second channels of the second honeycomb carriers 50, and the second connection pipe 60 in sequence, and finally into the exhaust pipe 90 and then into the air.

When the exhaust gas passes through the first channels 23 of the first honeycomb carrier 20, the first catalyst layer containing more rhodium catalyzes a redox reaction of carbon monoxides, hydrocarbons, and nitrogen oxides. With the high temperature condition produced from the diesel engine 80, the temperature rises to 450° C. or higher in the first honeycomb carrier 20 and exhaust gas passing by would be re-combusted and reacted with the first catalyst layer and reduced in particle size, allowing the burned exhaust gas to pass into the second casings 40 through the first connection pipe 30.

If the exhaust gas after burning still contains oversized particulate matters that cannot pass through the second channels of the second honeycomb carriers 50, the oversized particulate matters remain in the first connection pipe 30 and are repeatedly burned under the high temperature condition until their sizes are reduced to a desired size. When the burned exhaust gas passes through the second channels of the second honeycomb carrier 50, the second catalyst layer containing more palladium enhances the combustion, resulting in the complete combustion of these particulate matters in the second channels.

With the effect of the catalytic converter 1, the harmful components contained in the exhaust gas discharged from the diesel engine 80 turn into harmless components such as nitrogen gas, oxygen gas, carbon dioxide, and water, and then discharge from the exhaust pipe 90. Accordingly, the problem of air pollution is solved.

Since the cell density of the first honeycomb carrier 20 is less than those of the second honeycomb carriers 40, back pressure is not too significant in the area between the first honeycomb carrier 20 and the diesel engine 80 to hinder the displacement of exhaust gas.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A catalytic converter, having
a first casing;
a first honeycomb carrier having multiple first metal sheets and a first catalyst layer, the first metal sheets disposed in the first casing and connected with each other to form multiple first channels in the first casing, the first catalyst layer formed on the surfaces of the first metal sheets, and a material of the first catalyst layer including platinum, palladium, and rhodium;
multiple second casings connected to the first casing; and multiple second honeycomb carriers each respectively disposed in the second casings, each one of the second honeycomb carriers having:
multiple second metal sheets and a second catalyst layer, the second metal sheets disposed in the second casing and connected with each other to form multiple second channels in said corresponding second casing, the second catalyst layer formed on the surfaces of the second metal sheets, and a material of the second catalyst layer including platinum, palladium, and rhodium.

2. The catalytic converter as claimed in claim 1, wherein the cell density of the first honeycomb carrier is less than the cell density of each one of the second honeycomb carriers.

3. The catalytic converter as claimed in claim 2, wherein the cell density of the first honeycomb carrier ranges from 200 cells per square inch to 300 cells per square inch, and the cell density of each one of the second honeycomb carriers ranges from 600 cells per square inch to 800 cells per square inch.

4. The catalytic converter as claimed in claim 3, wherein the amount of rhodium in the first catalyst layer is more than that of platinum or palladium in the first catalyst layer.

5. The catalytic converter as claimed in claim 2, wherein the amount of rhodium in the first catalyst layer is more than that of platinum or palladium in the first catalyst layer.

6. The catalytic converter as claimed in claim 2, wherein the amount of palladium in each one of the second catalyst layers is more than that of platinum or rhodium in each one of the second catalyst layers.

7. The catalytic converter as claimed in claim 3, wherein the amount of palladium in each one of the second catalyst layers is more than that of platinum or rhodium in each one of the second catalyst layers.

8. The catalytic converter as claimed in claim 2, wherein the first honeycomb carrier has a first hollow cylinder disposed in the first casing, the first metal sheets are disposed in the first hollow cylinder and connected with each other to form the first channels in the first hollow cylinder, each one of the second honeycomb carriers has a second hollow cylinder disposed in the second casing, the second metal sheets of each one of the second honeycomb carriers are disposed in the corresponding second hollow cylinder and connected with each other to form the second channels in each one of the second hollow cylinders.

9. The catalytic converter as claimed in claim 2, wherein the first casing is connected to the second casings by a first connection pipe.

10. The catalytic converter as claimed in claim 1, wherein the amount of rhodium in the first catalyst layer is more than that of platinum or palladium in the first catalyst layer.

11. The catalytic converter as claimed in claim 10, wherein the amount of palladium in each one of the second catalyst layers is more than that of platinum or rhodium in each one of the second catalyst layers.

12. The catalytic converter as claimed in claim 10, wherein the first honeycomb carrier has a first hollow cylinder disposed in the first casing, the first metal sheets are disposed in the first hollow cylinder and connected with each other to form the first channels in the first hollow cylinder, each one of the second honeycomb carriers has a second hollow cylinder disposed in the second casing, the second metal sheets of each one of the second honeycomb carriers are disposed in the corresponding second hollow cylinder and connected with each other to form the second channels in each one of the second hollow cylinders.

13. The catalytic converter as claimed in claim 10, wherein the first casing is connected to the second casings by a first connection pipe.

14. The catalytic converter as claimed in claim 1, wherein the amount of palladium in each one of the second catalyst layers is more than that of platinum or rhodium in each one of the second catalyst layers.

15. The catalytic converter as claimed in claim 14, wherein the first honeycomb carrier has a first hollow cylinder disposed in the first casing, the first metal sheets are disposed in the first hollow cylinder and connected with each other to form the first channels in the first hollow cylinder, each one of the second honeycomb carriers has a second hollow cylinder disposed in the second casing, the second metal sheets of each one of the second honeycomb carriers are disposed in the corresponding second hollow cylinder and connected with each other to form the second channels in each one of the second hollow cylinders.

16. The catalytic converter as claimed in claim 14, wherein the first casing is connected to the second casings by a first connection pipe.

17. The catalytic converter as claimed in claim 1, wherein the first honeycomb carrier has a first hollow cylinder disposed in the first casing, the first metal sheets are disposed in the first hollow cylinder and connected with each other to form the first channels in the first hollow cylinder, each one of the second honeycomb carriers has a second hollow cylinder disposed in the second casing, the second metal sheets of each-one of the second honeycomb carriers are disposed in the corresponding second hollow cylinder and connected with each other to form the second channels in each one of the second hollow cylinders.

18. The catalytic converter as claimed in claim 17, wherein the first casing is connected to the second casings by a first connection pipe.

19. The catalytic converter as claimed in claim 1, wherein the first casing is connected to the second casings by a first connection pipe.

* * * * *